United States Patent [19]

DeMoss et al.

[11] Patent Number: 4,607,304
[45] Date of Patent: Aug. 19, 1986

[54] SEGMENTED SPACER MEANS FOR FLOPPY DISK PACKS

[75] Inventors: Dean DeMoss, Camarillo; Harvey J. Richardson, Sunnyvale, both of Calif.

[73] Assignee: Burroughs Corporation, Detroit, Mich.

[21] Appl. No.: 400,757

[22] Filed: Jul. 22, 1982

Related U.S. Application Data

[63] Continuation-in-part of Ser. No. 156,197, Jun. 3, 1980, Pat. No. 4,352,135.

[51] Int. Cl.⁴ .................. G11B 23/02; G11B 5/016
[52] U.S. Cl. ................................. 360/99; 360/133
[58] Field of Search .................. 360/97, 98, 99, 133

[56] References Cited

U.S. PATENT DOCUMENTS

| | | | |
|---|---|---|---|
| 4,229,774 | 10/1980 | Janssen et al. | 360/99 |
| 4,237,503 | 12/1980 | Ragle | 360/99 |
| 4,352,135 | 9/1982 | DeMoss et al. | 360/99 X |
| 4,370,688 | 1/1983 | Richardson | 360/99 |

OTHER PUBLICATIONS

IBM Technical Disclosure Bulletin–vol. 17, No. 8-1/75, "Controlled Spacing of Stacked Flexible Magnetic Discs"–F. T. Kendall.

Primary Examiner—John H. Wolff
Attorney, Agent, or Firm—John J. McCormack; Nathan Cass; Kevin R. Peterson

[57] ABSTRACT

Improved flexible disk pack magnetic storage systems and associated elements are illustrated as adapted for pneumatic partitioning and indicate, among other features, the use of spacer segments in the gap between adjacent flexible disks these being pre-attached to each disk to isolate the axial pressurized air streams from non-selected gaps and also to provide a reference surface for registration of the disks in the course of compressing the stack together.

21 Claims, 22 Drawing Figures

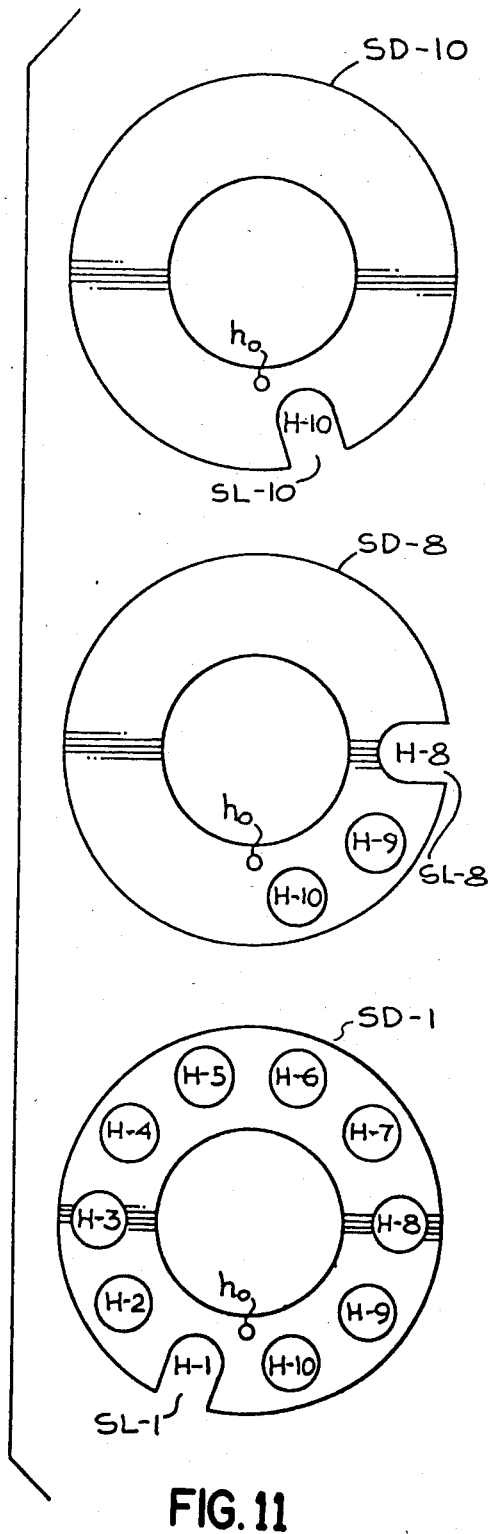
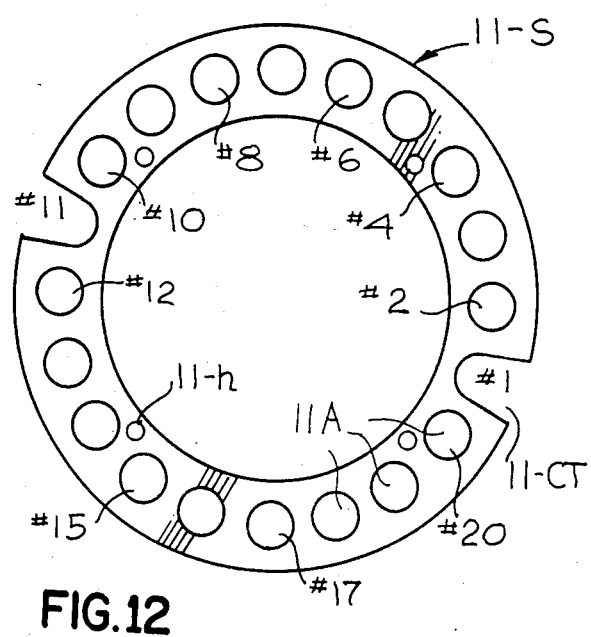
FIG. 11
FIG. 12

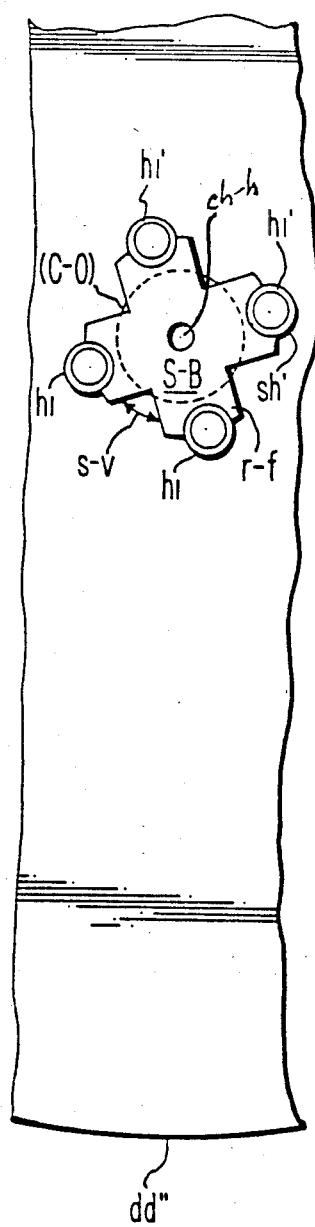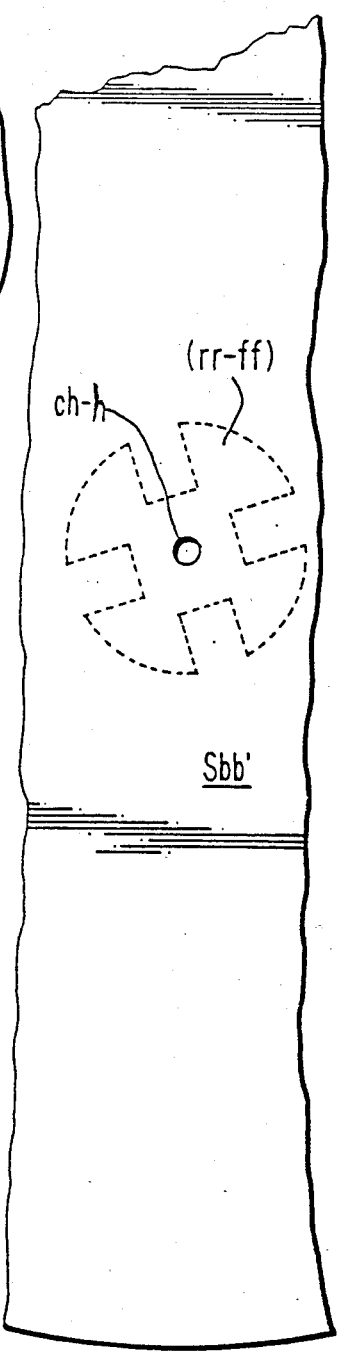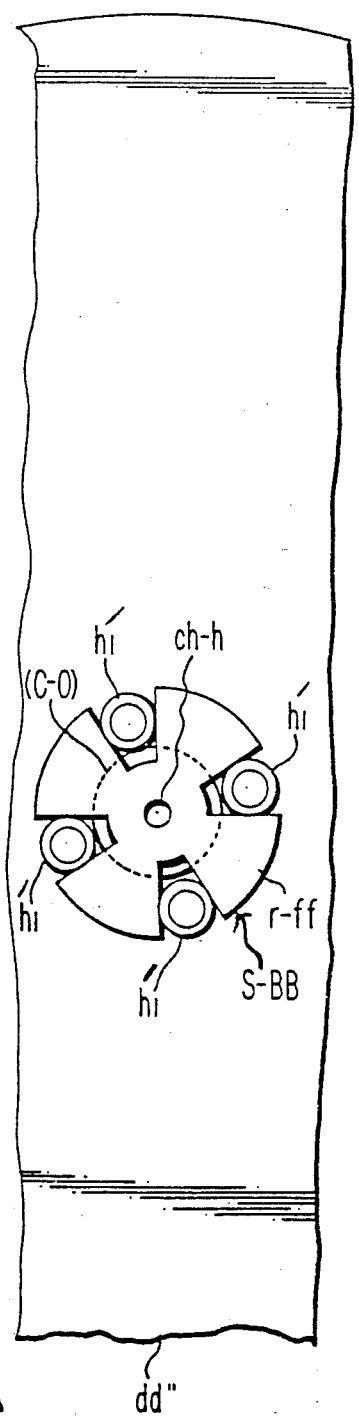

SEGMENTED SPACER MEANS FOR FLOPPY DISK PACKS

This is a continuation-in-part of our U.S. Ser. No. 156,197, filed June 3, 1980, for "Floppy Pack With Improved Spacer Means," and now U.S. Pat. No. 4,352,135.

INTRODUCTION, BACKGROUND

This invention relates to flexible recording disk packs and particularly to improved techniques for developing a stacked array of flexible disks.

Workers in the subject art have constructed record storage apparatus using coaxial stacks of flexible record disks, as indicated, for instance in U.S. Pat. Nos. 3,838,462; 3,838,461; 3,969,767 and 4,167,029.

Workers are aware that the use of floppy disk packs dictate minimal cost for pack elements and associated equipment, such as partitioning means. The invention is directed toward this end, and toward accommodating a simple, non-mechanical, pneumatic end-wise partitioning of floppy disk packs, as well as toward providing improved disk packs which are better adapted to meet the foregoing problems and objectives. Such disk packs and associated end-wise partitioning means may be gleaned from the cited U.S. Pat. No. 4,167,029 for "Jet Distributor for End-Wise Pneumatic Partitioning of Disk Pack" filed by H. Ragle et al. and commonly assigned herewith, this being incorporated herein by reference.

For instance, in some prior versions of such pneumatically partitioned floppy packs, an axially movable piston is disclosed as positioned within the tubular spindle-hole and adapted to control an input air flow for generating the access opening in a selected gap (i.e., for "hub-originated air partitioning"). A jet of air received by the piston can be redirected to supply a circumferentially aligned, radially-directed air jet for initiating the partition opening. In many instances, it is preferred that the disk being transduced be backed by fully spaced, stable disks. To this end, separation air may be supplied to floppy disks adjacent to the selected disk. Unlike such "hub-originated" air-partitioning, the invention directs partitioning air streams axially of the pack and guides them across inter-disk gaps using "rim means according to this invention.

Thus, in one preferred embodiment the invention will be seen to comprise an axially-partitioned pack of recording disks flanked by upper and lower "dummy" packs, these in turn flanked by respective (upper, lower) end-plates. Partition holes are provided through the disks, with annular rim means provided to surround these holes and afford better pneumatic isolation as well as providing a surface for disk support. According to this improvement feature, each "recording gap" (space between recording disks) has at least one of these rim means broken-away (at least partly, and preferably so as to divert air radially inward) so that the associated partition air jet will be circulated more widely as the pack rotates. In a further related feature, such rim means are combined with an inner "hub-rim" to isolate the hub (spindle) area, to deflect and distribute gap air and to cooperate with the rim means in creating a solid support surface for adjacent disks. Such a rim and rim means will be seen to direct and divert partitioning-air along the plane of the disks for more effective pneumatic partitioning.

PRIOR ART

Workers in the art have, of course, considered various techniques for providing flexible disk packs. For instance, in cited U.S. Pat. No. 3,969,767 to Griffiths et al (and in references noted therein) attention is directed to semi-rigid washers, coaxially disposed to form an air-permeable spindle for coaxially supporting flexible record disks. Such washers have radially extending passageways and teach a rotating tubular spindle where means for supplying gas thereto to be distributed radially outward from the hub of such a pack through such air permeable washers. A rigid stabilizing plate at each axial end completes this assembly. The following IBM technical disclosure bulletins also show stacks of flexible disks with various means of partitioning suggested: IBM-TDB August 1977, page 914; IBM-TDB of April 1977, page 4229 (showing "vent holes" for self-ventilation of the pack, except for provision of a relatively nonapertured central disk) and IBM-TDB of November 1974, pages 1710, 1711 (where a record disk pack is flanked by upper and lower dummy packs including disks separated by spacers and wherein the disks include a ring of ventilation holes to be placed in registry along the stack). Neither this nor any other known prior art has any suggestion of the forementioned "rimming" of partition holes in the gaps between disks.

The present invention is directed toward providing improved flexible disk packs—these being better adapted to meet the foregoing problems and objectives. The foregoing and other features, objects and advantages according to this invention will be more fully appreciated and will become more apparent upon consideration of the following description of the preferred embodiments taken in conjunction with the attached drawings, wherein like reference indicia denote like elements.

BRIEF DESCRIPTION OF THE DRAWINGS

FIGS. 3 and 4A-4C show respective forms of a disk from such a pack, as modified with a "rimmed" spacer according to the invention—one that is formed of two half-spacers pressed "back-to-back"; while FIG. 4A shows a schematic sectional view of such a spacer in place between floppy disks; and FIG. 4B is a like view of two such half-spacers pressed face-to-face and FIG. 4C is a like view of an array of like "rimmed" spacers, each formed from one integral piece.

FIG. 11 is a plan view of a set of "non-rimmed" spacers unlike those of the invention while FIG. 12 similarly shows another kind of "non-rimmed" spacer; and FIG. 13 shows in partial plan view a flexible disk surface including an alternative embodiment of "rim means"; while FIG. 14 is a like view of a modification of such an embodiment. FIG. 15 shows an array of rims like that of FIG. 4, somewhat modified, as does FIG. 16 in yet a further modification, while FIG. 17 illustrates yet a further modification of rim segments formed from a common blank; such a blank being indicated in phantom in FIG. 18, with FIG. 19 indicating a different mode of cutting out the blank.

DETAILS OF THE PREFERRED EMBODIMENT

An improved spacer embodiment is taught, one intended to afford better partitioning with such floppy disk packs according to the invention. Such will now be described in terms of the preferred embodiment shown in FIGS. 1-5.

EMBODIMENT OF FIGS. 1-5

Figure 1:
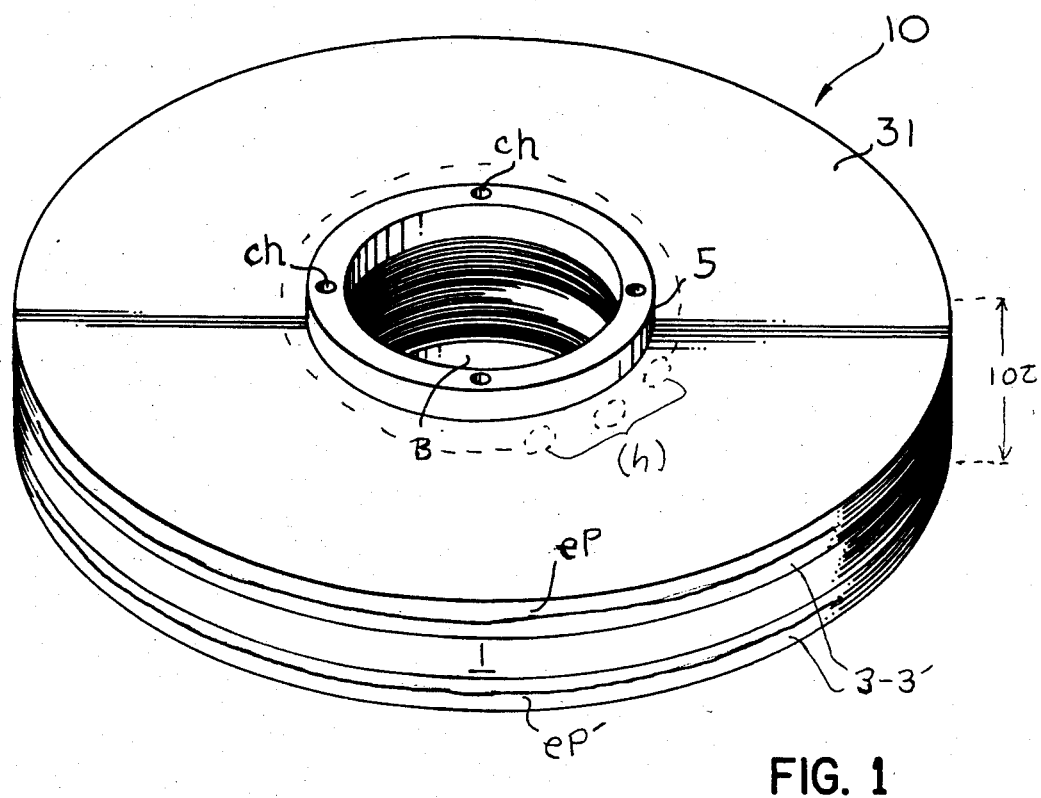
FIG. 1 is an upper perspective rather schematic showing of a flexible disk pack adapted for using the subject invention; with FIG. 5 showing this pack in partial schematic side section.
Figure 5:
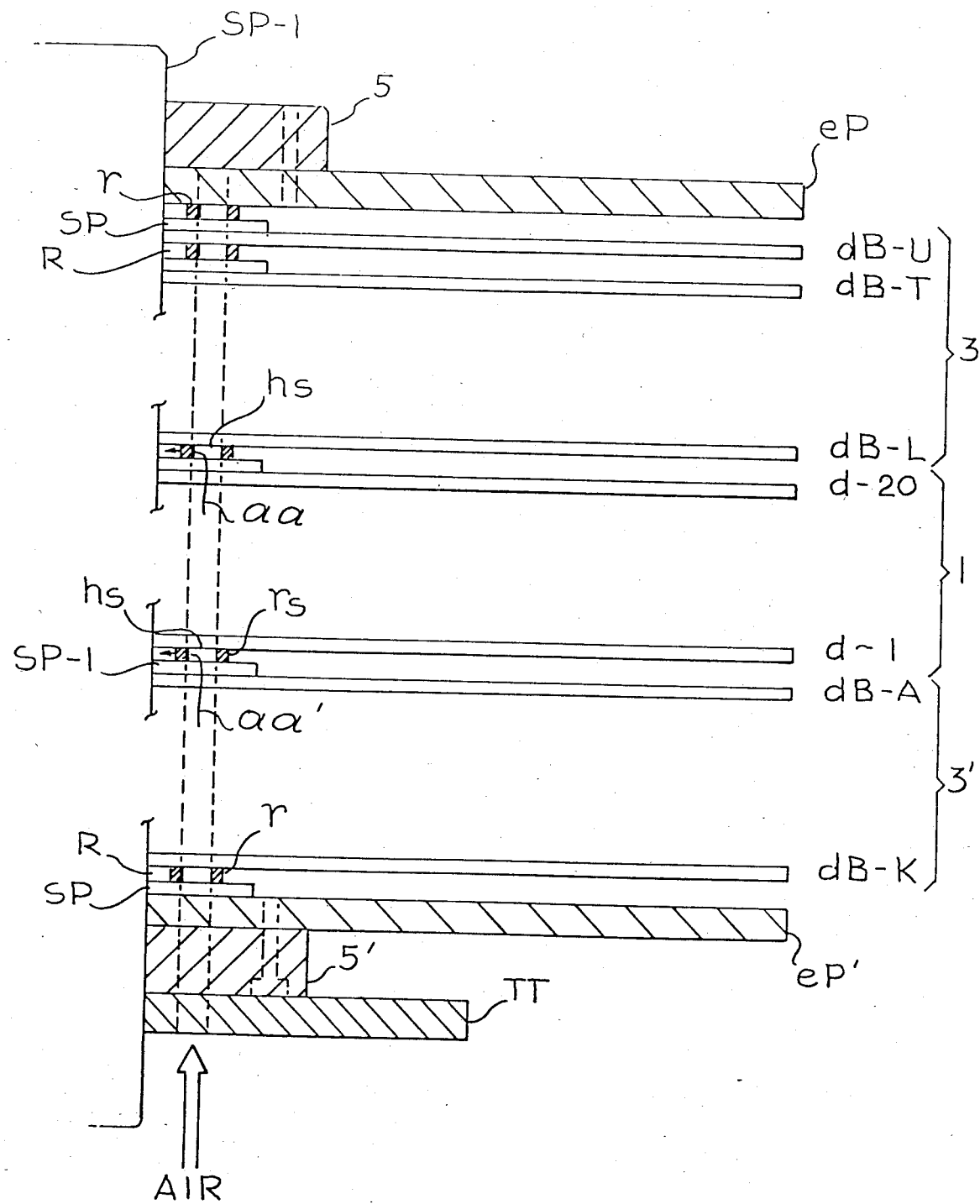
FIG. 5 shows a preferred embodiment.

A composite flexible magnetic recording disk unit 10 is shown in FIGS. 1 and 5 and will be understood as adapted to impart improved axial partitioning characteristics. Unit 10 will be understood as comprised of three multi-floppy disk packs, with spacers between all floppy disks; i.e., a recording pack 1, flanked by a pair of upper/lower "dummy" packs 3, 3', plus associated outer end-plates eP, eP' or stiffeners. Unit 10 is adapted to be conventionally engaged by a known rotation assembly for prescribed high speed rotation (like those used with other high performance floppy pack arrangements and involving disk rotation on the order of several thousand rpm or more). Disk rotation, transducer operation and associated control means will be understood as provided by conventional means (not shown here).

That is, recording pack 1 comprises a stack of like flexible recording disks (e.g., d-1, etc., preferably of a conventional diameter, 1.5 mil polyethylene terephthalate) stacked in registry for high speed rotation, being separated uniformly by cylindrical washers, or "spacers". Here, "separation air" and "partition-air" is to be drawn axially, via partition holes h, through the disks and the spacers as more completely detailed in U.S. Ser. No. 960,267, filed Nov. 6, 1978 for "Partitionable Record Pack" by Dean DeMoss and Herbert U. Ragle or in U.S. Ser. No. 155,366, filed June 2, 1980, for "End-Wise Partitionable Disk Pack" by Dean DeMoss and Herbert U. Ragle (hereby incorporated herein by this reference).

Each "dummy" pack 3, 3' may be understood as comprising an outer stiffener (cf end-plates eP, eP' mentioned below) and an array of adjacent spaced supporting flexible disks, or ("dummy" disks dB-A, etc.), these being separated by spacers (sufficient to accommodate a prescribed maximum deflection of record disks d). This will also accommodate a prescribed maximum deflection upon head entry—without detracting from the normal flexible disk/head engagement familiar to those in the art of floppy disk recording with stacks of floppy disks. The planar end-plates (or stabilizer plates) may a conventional rigid pack, but preferably comprise a stack (e.g., 30) of contiguous un-spaced floppy disks like the disks in packs 1, 3, 3'—each end plate to be centrifugally spun-flat once the array 10 reaches nominal rpm (as detailed in U.S. Ser. No. 155,366 cited elsewhere). The end-plates are apertured with partition holes and fastener-holes adapted to register with those through the disks and spacers (congruent patterns) as indicated functionally in FIG. 5.

Dummy packs 3 and 3' are provided to offer a smooth transition between the adjacent rotationally-stiffened end-plate and the deflecting motions of the recording disks in pack 1, during partition deflection. Thus, each dummy stack serves to separate the closest recording disk d from an (otherwise-adjacent) end-plate by a prescribed distance which allows maximum partitiondeflection thereof, while still isolating it somewhat from "high pneumatic impedance" zones adjacent that end-plate.

The record and flanking "dummy" packs are all held together in one integral disk unit, (module 10) by rigid relatively conventional retaining plates, such as collars 5, 5' illustrated and their associated fasteners (e.g., connecting rods, not shown). Such fasteners (rods) may be threaded through the collars (see four coupling-holes ch) and intermediate disks, spacers and end-plates—these all being apertured to receive them (e.g., via coupling holes ch). Such collars also serve to close (upper collar) the upper end of the partition bores since they are wide enough and properly located to span these. Retaining plates (collars) will not be necessary where the multi-floppy stabilizer plates eP, eP' are replaced by conventional rigid end-plates (and the upper rigid plate will not be perforated with partition holes). The central hub-bore defined by the stacked disks will be understood as conventional (e.g., 1.0" dia. here) for accommodating drive-spindle means. The entire module 10 is adapted for engagement with an accommodating turntable, as known in the art.

Ordinarily, the indicated clamping—i.e., pressing the collars against the flexible disk material and intervening spacers—will be adequate to hold the relative position of disks and spacers. The central bore B (see $H_c$ in FIG. 3), or hub channel, may be any convenient size to accommodate rotation coupling means. Unlike conventional hub-holes, however, it will not be required to admit "partition air" or "separation air" (to be passed through the spacers radially into the gaps between floppy disks). This is because such air can, instead, be introduced via partition holes h as noted below.

RECORD PACK 1

In its preferred form, the record pack 1 will be understood as preferably comprising a stack of like flexible recording disks stacked in registry and uniformly separated by like spacers, with the supporting "dummydisks" being provided to accommodate the expected partition deflections and resilient engagement of such recording disks with an associated transducer. (A typical known rigid "floppy disk transducer" such as transducer TR, FIG. 2, being preferred, as known in the art). Pack 1 is here preferably comprised of about 20 floppy disks (1.5 mil each), stacked to each be uniformly separated by a rigid spacer/washer (e.g., made of metal, plastic or the like—disks and spacers being perforated with the mentioned holes h, ch).

PNEUMATIC, AXIAL PARTITIONING; FIG. 2

Figure 2:
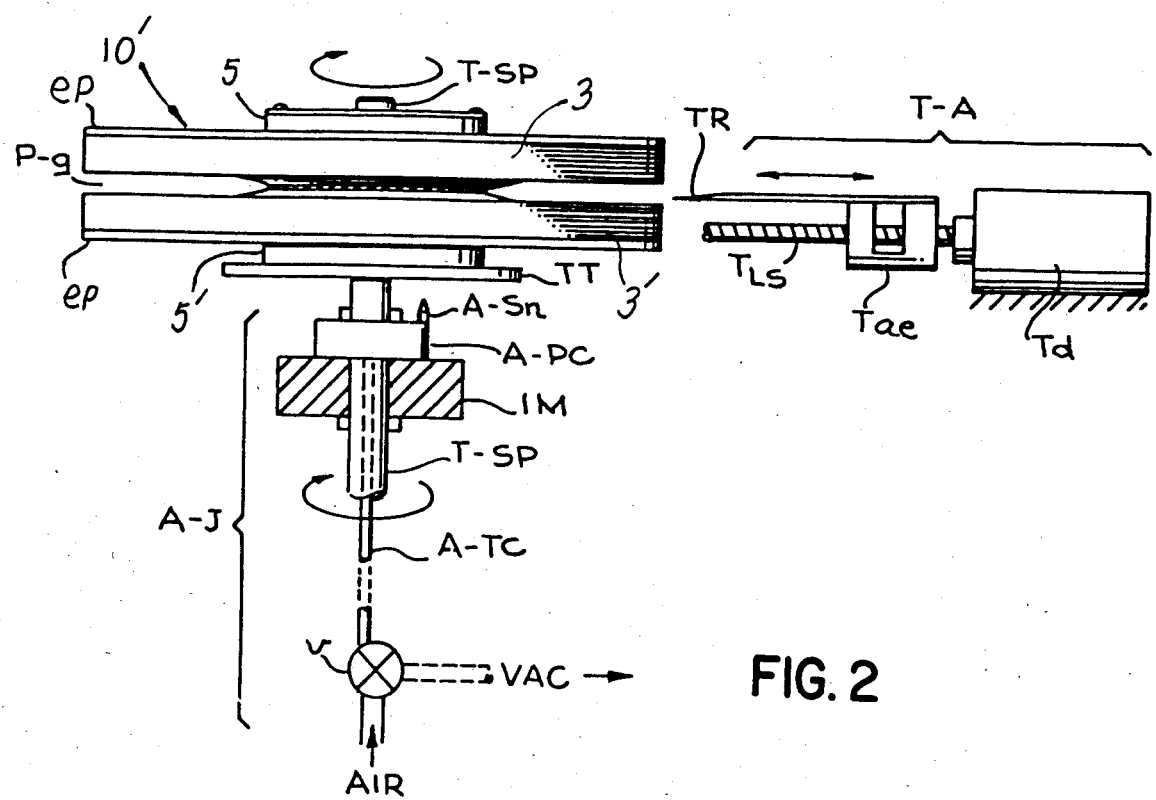
FIG. 2 is a rather schematic elevation showing a simplified exemplary arrangement for end-wise pneumatic partitioning of such a disk pack, along with means for rotating the pack and means for selectively injecting a transducer assembly into the pack.

FIG. 2 schematically suggests how a floppy pack embodiment like that of FIGS. 1 and 3-5 may be partitioned axially, or "end-wise", and pneumatically (for more details please refer to U.S. Ser. No. 155,366 cited above).

Thus, FIG. 2 is a schematic, rather generalized functional showing of a flexible disk unit 10' mounted on a conventional spindle T-SP and turntable TT (for relatively high speed rotation; unit 10 being understood as generally the same as unit 10 described above, being retained between a pair of collars 5, 5'. A pneumatic partition assembly AJ will be understood as adapted to pneumatically partition the record pack 1 (between dummy packs 3, 3' as in FIG. 1) for access entry of a conventional transducer array TR, adapted for high speed transduction as generally understood in the art. Here, and elsewhere, the materials, mechanisms and systems alluded-to should be understood as conventionally constructed and operated as presently known in the art, except where otherwise mentioned.

For illustration purposes, a conventional transducer array TA is very functionally indicated and understood as adapted for selective translation (as indicated by arrow) into, and out of, partition gap p-g between recording disks in pack 1 so as to present the transducer array TR in transducing relation with a prescribed disk surface. The partitioning air supplied by partition jet assembly AJ is adapted to present a high speed jet of partitioning air end-wise of unit 10', to be entrained up a prescribed one of the bores generated by the array of registered partitioning-apertures h in the spacers and disks. This selection may be controlled according to the rotational position, or indexing, of a delivery jet nozzle A-SN relative to unit 10'.

"RIMMED" PARTITION-HOLES, FIGS. 3, 4 AND 5

Figure 3:
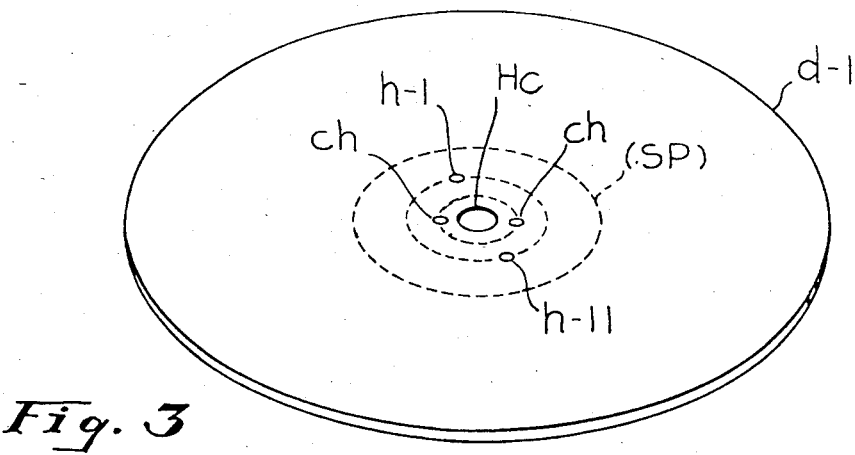
Figure 4:
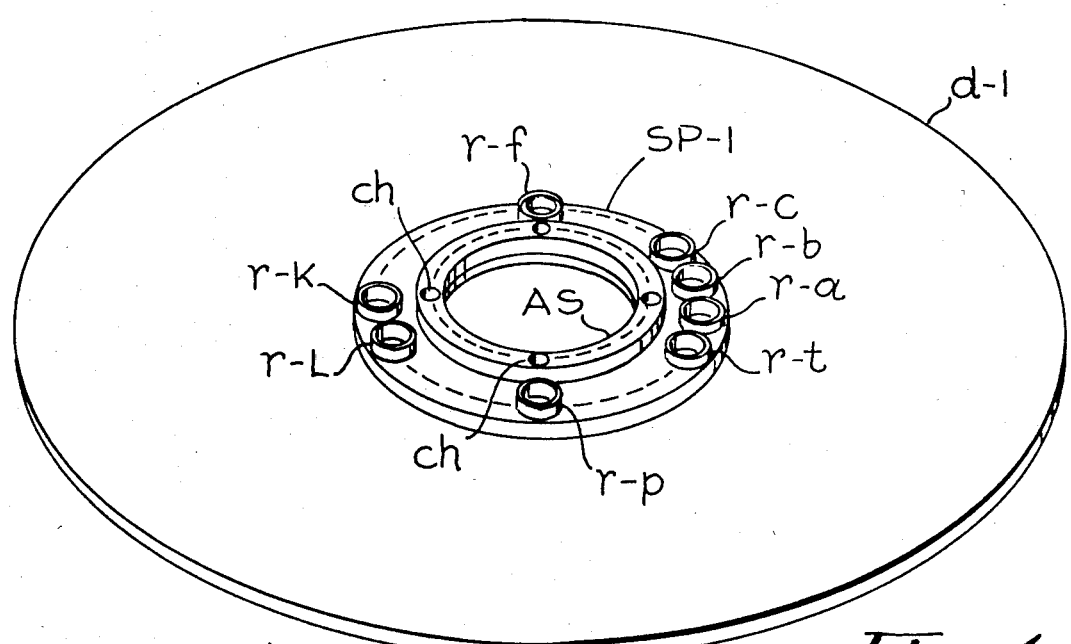

FIGS. 3–5 indicate how the circumferential array of partition holes h are disposed in registry through the disks and intermediate spacers (so stacked) to form an array of "partition bores" extending axially of unit 10. More particularly, they indicate how, according to a feature of invention, air conduit means, or "rims", may also be used to afford more effective jet conduction along such bores between disks, and also to, collectively, provide an annular "support-plane" (made up of a circumferential array of rims, e.g., the top surfaces of rings r-a through r-t in FIG. 4).

In a related feature, one can see that certain of these "rims" are "partial", i.e., broken-away so as to extend less than 360° about their hole h and so as to divert their jet stream into the inter-disk gap they bridge. (AS discussed below, for instance, in FIG. 5 note arrows aa and aa' wherein the jet stream is functionally indicated as proceeding from its entry point, at "AIR", to emerge and be directed radially inward along two inter-disk gaps, namely that between disks d-1 and dB-A and that between disk dB-u and upper end-plate eP. It will be understood that the partition air column along any partition bore, may, for instance, be directed to traverse the full bore-height, between bottom end-plate eP' and upper collar 5 (closing all holes h). Thus, the jet column may, in effect, rebound off the upper metal collar 5 and return to exit at the "selected" gap, or gaps, having an associated "semi-rim" opening as "exit-orifice".

As detailed below, this may be effected by using spacer means as constructed from "half-spacers" (see sp-a, sp-b in FIGS. 8 and 9) bonded together, "back-to-back". Such spacers include an identical circumferential array of partition holes h, all provided with full cylindrical rims (rings r), except in the case of "select holes" hs where only a "semi-rim" (or half-ring) $r_s$ is provided. Semi-rims $r_s$ are adapted to divert and redirect their jet stream inwardly for better pneumatic partitioning of their associated gap (as described below). Similarly in FIG. 5 the "select hole" hs in spacer SP-1, between disks d-1 and dB-A will be understood as surrounded by a "half-rim" $r_s$ to divert air in the manner indicated by arrow aa'.

The floppy disks in stacks 1, 3 and 3' (FIGS. 1 and 5) will thus be understood as generally including a conventional center hole $H_c$ as indicated in FIG. 1 surrounded by a conventional array of coupling holes ch adapted to receive the coupling bolts retaining the packs together (e.g., between upper and lower collars 5, 5', as in FIGS. 1 and 5). The circumferential array of holes ch is, in turn, surrounded by a circumferential array of partition holes h (20 holes, h-1 through h-20 are illustrated on record disk d-1 in FIG. 3).

Thus all spacers and all disks will have 20 partition holes h and be stacked so these holes (and the coupling holes) register in a particular pattern. Those holes will be rimmed, or semi-rimmed, on at least one side of each spacer (preferably on both sides). The semi-rim may encompass roughly 180° on the radially-outer side of a spacer's partition hole, or encompass more or less degrees depending upon the desired jet deflection and diversion. In some instances (e.g., see FIGS. 13 and 14) the spacers may be eliminated, with the floppy disks themselves being "rimmed".

Hub-rim AS provides a registration surface against which the adjacent floppy disk surface may be pressed and positioned—as well as preventing the exit or entry of air from the hub region and deflecting and diffusing an incident jet stream. Rim AS also keeps the disks relatively flat, especially as used in conjunction with the "co-planar surface" formed by the circumferential array of partition-rims r—all these being of the same height.

Figure 8:
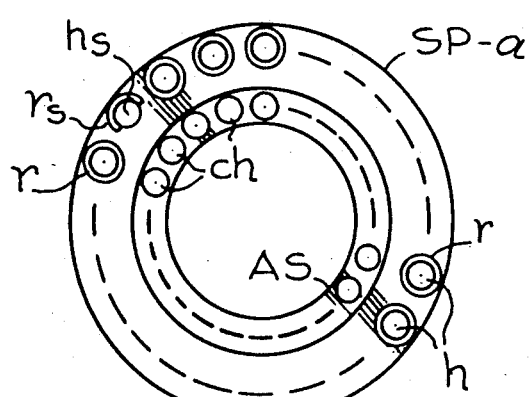
Figure 9:
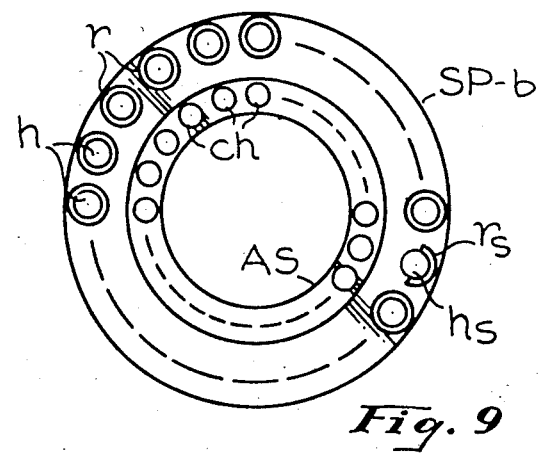

One may form the spacer disks of metal, as with half-spacers sp-a, sp-b in FIGS. 8 and 9. This may be any convenient etchable metal (or other rigid material such as plastic) the rimming may readily be etched-away on one surface of such metal half-spacers, to thereby present rim means on one side thereof. This technique is well known and readily available.

Figure 4A:
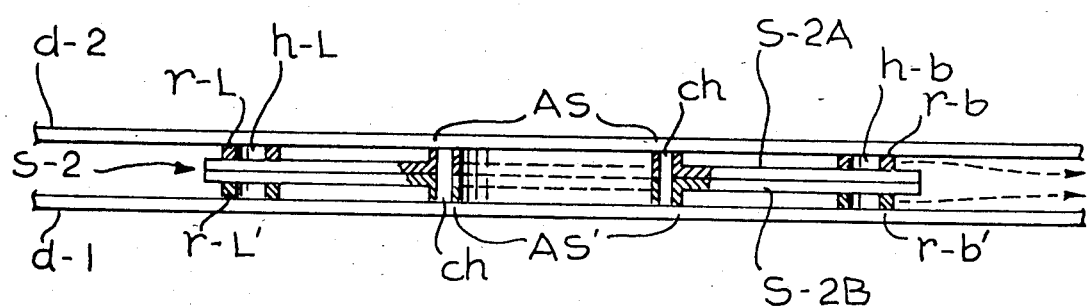
Figure 4B:
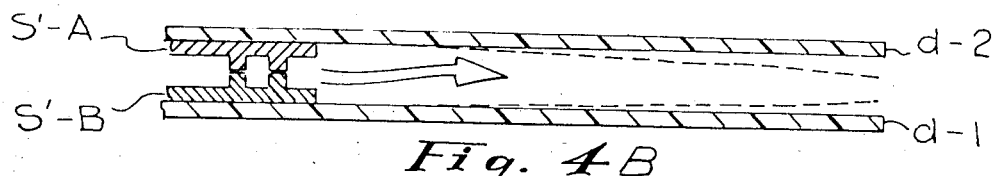

Such half-spacers may be pressed "back-to-back" (with non-rimmed faces flush) into a bi-port spacer held together by the collars 5, 5' and connecting rods. When the two semi-rims pass air they will, in effect, form two upper/lower orifices and project two mini-jets of separation air; these following the two opposed respective disk surfaces, as indicated in FIG. 4A (see arrows). Alternatively, such half-spacers S-2A, S-2B may be pressed "face-to-face" to form one larger, mergent, central air stream as indicated in FIG. 4B (see arrow-)—but unfortunately such a stream tends to introduce a partial vacuum and suck the disk edges together (as indicated in phantom in FIG. 4B), thus closing-down the inter-disk gap undesirably.

Figure 4C:
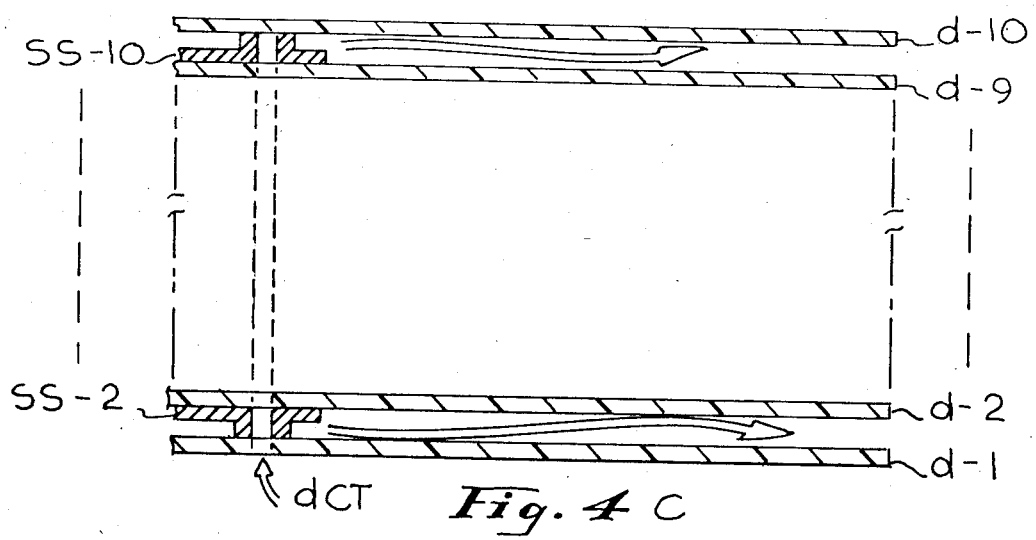

In some cases it will be preferable to fashion the rigid spacer from a single integral plate as indicated in FIG. 4C at SS-2 and SS-10; especially, since this will effectively replace the two mini-jets of the FIG. 4A embodiment (half-spacer/back-to-back) with a single larger more effective jet stream.

For instance, half-spacers S-2A, S-2B of FIG. 4A may comprise 10 mil aluminum stock etched-back by about one-half (leaving 5 mils as base with 5 mil rims thereon)—this presenting a pair of upper/lower, high-impedance 5 mil jet orifices in each 20 mil gap (e.g., as between d-1, d-2 in FIG. 4A), with some possible dead-space (non laminar flow) adjacent the opposing disk surfaces. By contrast, the single spacer embodiment of FIG. 4C may comprise 20 mil stock, similarly etched-away by half, leaving 10 mil rims (on 10 mil base) and a single jet orifice 10 mils high.

It was observed that spacers like those of FIG. 4A induced an undesirable "clumping" of disks—whereby some disks appeared to merge toward one another, and so attenuate their respective gap-heights (or disk-separation, at least adjacent their outer periphery), while others would diverge and so open-up their separation distances, and still others would not appear to be affected, maintaining the prescribed separation. Surprisingly, this phenomenon was also repeatable—not random—i.e., every gap would react the same way for a given set-up no matter how many times the pack rotation was interrupted. Also, this clumping should be distinguished from a "wobble" or "flutter" of a disks periphery—such is not involved here.

Surprisingly, when the bi-part spacer configuration (of 4A, etc., which projects two tiny jet streams out each gap) was replaced by a single-sided version as with (either) SS-2 or SS-10 in FIG. 4C, the problem essentially disappeared—with the disks flying much more evenly and with almost perfectly constant separation and no "clumping" (at least to the naked eye). This was so even when these "single-sided" spacers were not arranged in "stacked (up/down) opposition" (as in FIG. 4C, i.e., even where all spacers had their "rimmed" side facing up, or all down).

Figures 13, 14:
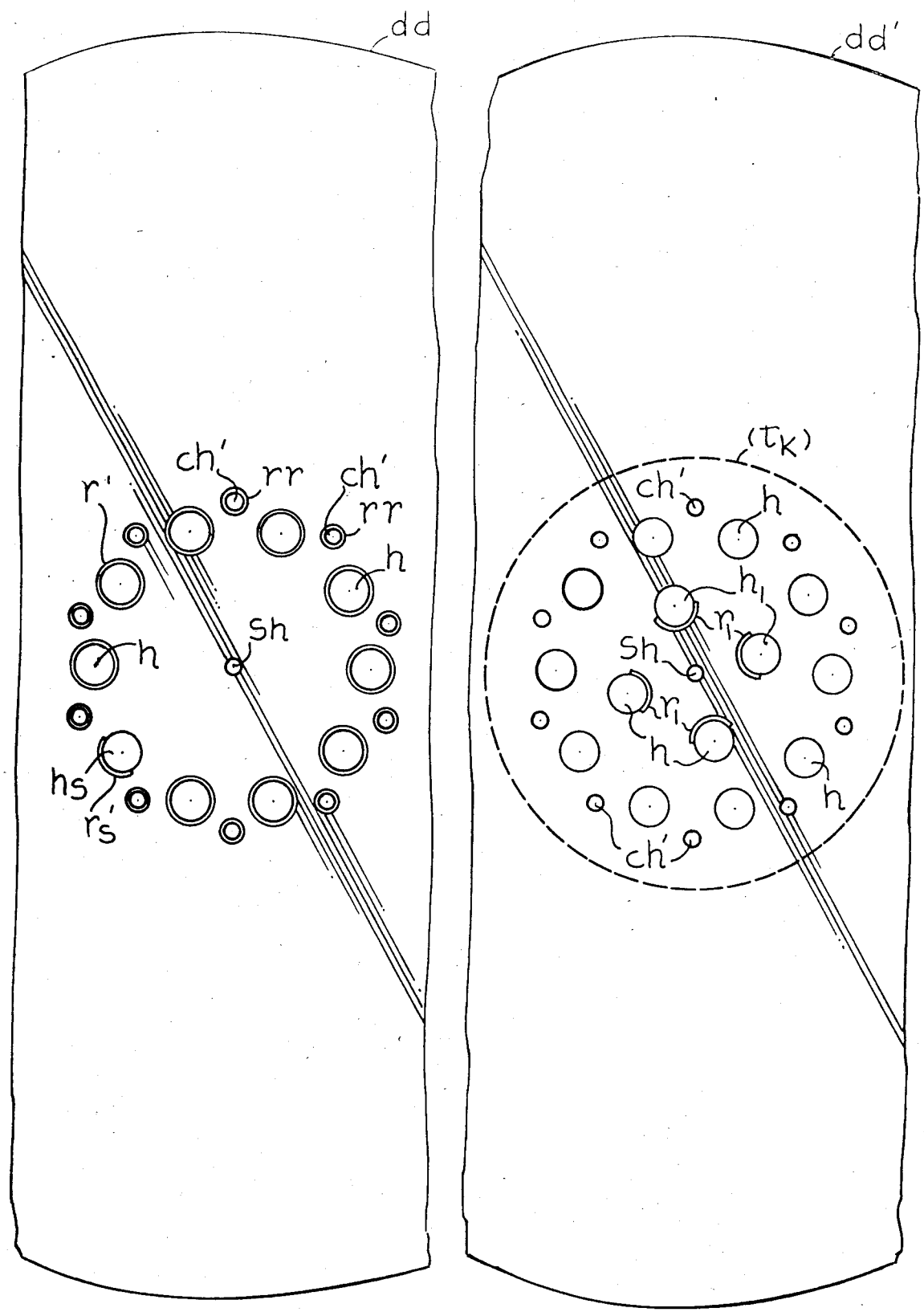

Alternatively, one may form such rings out of plastic with rim-bosses bonded thereon as known in the art, or one may silk screen or paint the rim material onto the plastic disk itself as indicated for those in FIGS. 13 and 14.

FIG. 4 is similar, showing record disk d-1 with spacer SP-1 superposed thereon, the spacer being penetrated by a circumferential array of coupling holes ch—these to be stacked in registry with an identical array of like holes ch on disk d-1 and all the other disks and spacers. Also, a circumferential array of aperture holes h is provided in SP-1, these presumed as stacked in registry with hole array h-1 through h-20 in all disks and spacers (e.g., see FIG. 3). According to the aforementioned "rim" feature, each of these partition holes h is surrounded by a rim means r, there being 19 full identical cylindrical rims r-a and r-c through r-t, with one "partial rim" r-b (or semi-rim) at hole hs. "Semi-rim" r-b is adapted to admit the jet stream for partitioning at its gap, directing it radially inward for centrifugal distribution.

Spacer SP-1 will further be seen as including a "hub-rim" or annulus AS of a width sufficient to span the diameter of coupling holes ch, of the same height as rims r (which are all the same height) and completely circling the hub edge (or radially-innermost portion) of the spacer. Thus, when all the disks and intermediate spacers of unit 10 are compressed between collars 5, 5', the upper surfaces of rim AS and rim array r-a through r-t will be co-planar and form a reference surface and support platform for the floppy disk dB-A pressed thereon.

Thus, according to this feature of invention, when a partitioning jet stream is selectively directed up the "h-b" partition bore through unit 10, it passes spacer SP-1 between disks d-1 and dB-A and will emerge into the gap therebetween, being deflected and diverted by semi-rim r-b—proceeding radially inward and, striking hub-rim AS, to be redirected over a wide sectorial angle. Centrifugal forces experienced by the spinning pack will throw this stream radially out for better, more effective partitioning over a wider sectorial angle (as opposed to using other simpler spacer means, such as slotted spacers SD-1, etc., of FIG. 11, where the mere outward slotting of a partition hole is adapted to throw the jet stream outward in a narrower sectorial angle and thus partition the gap more narrowly).

Of course, workers will understand that such an array of partition holes and associated rim means may be modified so that several partition holes and associated semi-rims, rather than one, may be employed for each partition-gap. (Somewhat analogous to the opposed pair of slotted holes No. 1 and No. 11 in spacer 11S of FIG. 12, although this spacer is not provided with rim means, of course).

According to a further preferred feature of novelty, spacer SP-1 is preferably provided with a second (lower) rimmed face—a face identical to the upper rimmed face shown in FIG. 4, although this bottom face cannot be seen in this view, of course, it is suggested in FIG. 4A). Such an array would, thus provide aperture rims (such as r-a through r-t) plus an associated hub-rim (like AS) on both sides of spacer SP-1 (all the other spacers identical). Such an arrangement is schematically indicated in the fragmentary side-section of FIG. 4A. Here, note that the hub rim AS' on this bottom face is identical to rim AS on the upper face, and that the lower aperture-rims (e.g., r-b', r-l' shown) are, like their counterparts (e.g., r-b, r-l), "semi-rims" for inwardly diverting their air stream—the air streams on each side of SP-1 for the two opposing partition apertures h-b, h-l being indicated by the arrows.

One way of fabricating such a spacer means, rimmed on both faces according to the invention, is to construct it of two half-spacers pressed "back-to-back" in registry, as, for instance, with identical spacers SP-a, SP-b in FIGS. 8 and 9. These spacers may have their rims etched from annular metal plate means (or otherwise constructed using the same or different material as mentioned below) and placed back-to-back so that the select holes hs, with their semi-rims $r_s$ lie in registry—being held in place by collars 5, 5', etc.

Here and elsewhere, it will be apparent that, although four coupling rods (e.g., bolts or like fasteners) are contemplated in FIG. 1, one may provide redundant coupling holes ch in spacers SP-a, SP-b, etc., as necessary—e.g., one hole ch adjacent each partition hole. This is done simply for manufacturing and assembly convenience allowing any spacer to be rotated by any amount to register its partition holes with those of the rest of the pack—and still always present a coupling hole registered with these of collars 5, 5'. For instance, if, in assembling record pack 1, one wants to use a single common pattern for the record and spacers, he may do this and differentially stack the disks and spacers, rotating them relative to one another (e.g., see U.S. Pat. No. 4,086,641). This redundancy of coupling holes ch with one coupling hole in constant relation to each aperture hole h, thus allows rotation of the spacers relative to one another (in a stack, to change the registration of aperture holes h) will always bring a new coupling hole into registry with those of the pack.

Figure 6:
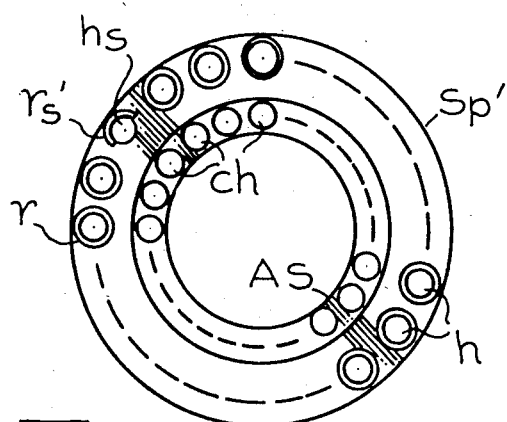
FIGS. 6 through 9 show the same, or similar, type spacers in plan view.
Figure 7:
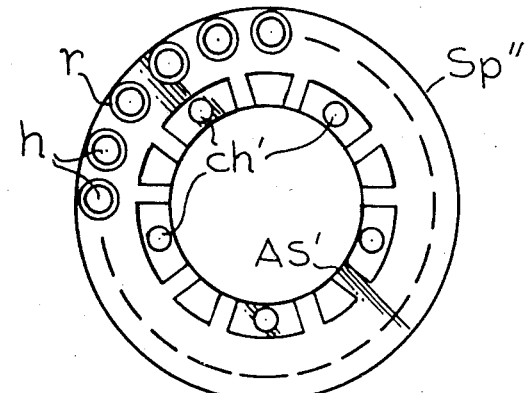

"Rimmed" spacer SP' in FIG. 6 will be understood as functionally the same as spacers sp-a, sp-b, except that its "select hole" hs is not "enlarged". And spacer SP" of FIG. 7 may be taken as representative of a spacer having no "select holes", and thus no "semi-rim" $r_s$—such a spacer may be useful in certain cases (e.g., with a dummy pack), although it is "non-preferred". Spacer SP" also illustrates a modified, "segmented" (or fenestrated) version of a hub-rim—i.e., a rim AS' which is not continuous and integral about the hub, but is breached, or segmented, in a regular symmetric pattern to admit radial passage of "separation air", e.g., air drawn-in to proceed radially-out from the hub region and expand the inter-disk gap.

Now, at first, it appeared that isolation or separation air could be introduced through the spindle hole and, passing through the openings in fenestrated rim AS' could adequately partition its respective gap. However, it was later observed that this mode tends to introduce insufficient air, "starving" the gap (e.g., between dummy disks) and inducing the flanking disks to collapse upon one another.

Accordingly, it is preferable to introduce separation air (e.g., even for the dummy-gaps) through the partition holes h—assuming sufficient holes are available for this. For instance, one or two particular partition holes may be set aside for use in common by all dummy disks; alternatively, each dummy-gap can be "slaved" to a respective recording gap and so caused to share the air therewith, as detailed elsewhere. Thus, for various reasons this mode of introducing separation air is non-preferred, as opposed to introducing such air through partition holes h as discussed elsewhere.

ALTERNATE "RIMMED" EMBODIMENTS: FIGS. 13, 14

Workers in the art will perceive that the aforedescribed feature of "rimmed partition holes" may be otherwise provided. For instance, as suggested for modified floppy disk dd in FIG. 13, the rimming means may be incorporated on the floppy disk itself (and also, if desired, the spacers may be eliminated). One way this may be done is indicated as rims r' and semirim r'$_s$-surrounding partition holes h (ten shown, interspersed with coupling holes ch' which are also rimmed with rings rr). In this way a spacer structure may be omitted. Coupling holes ch' are also rimmed, not for air-sealing purposes, but to better maintain the gap spacing and disk planarity. Thus, rims rr, of the same height as rims r', r'$_s$, surround holes ch' (and may surround spindle hole sh for a like reason). Thus, when the disk pack is compressed tightly, the disk faces defining each gap will have several more reference spacer-rims rr against which to be seated. This is more necessary when no rigid spacers are used, since the disks may otherwise be compressed or bent towards one another in the region of the retaining rods (10 rods here, threaded through a collar spanning the ring of holes h and ch', top and bottom). Also, disk dd illustrates the use of "rim means" with a "fixed" pack—as opposed to the "removable" packs illustrated above. Thus, as workers well known, the pack may be attached to the rotation means (e.g. to the turntable via bolts through holes ch' to a single, upper collar—rather than attaching the pack to a pair of opposed collars as in the foregoing embodiments). Center-hole sh is a "slight-hole" used for alignment purposes. Also, with no hub opening no "hub-rim" is appropriate here.

Also, the air jet stream diverted by semi-rim r'$_s$ will be diverted from "select hole" hs across the center of disk dd to be spun-up by centrifugal forces and directed radially outward through the gaps between the rims around holes h and ch'. Workers in the art will contemplate other like configurations for "rimming" the holes in a disk like dd and will perceive tha such can allow dispensing with spacers.

Workers will generally understand how such a rim arrangement may be implemented. For instance, such rim means are preferably provided on one side of each such floppy disk and comprise thin rings of plastic material bonded to the surface of the plastic disk (e.g., a like plastic which is heat-fused thereto) and so affixed in position about their associated hole.

FIG. 14 may be understood as illustrating another (alternative) "rimmed disk" arrangement, like disk dd in FIG. 13, except as hereafter specified. Here, a like flexible plastic (e.g., polyethylene terephthalate) disk dd' will be understood as also having a central spindle hole sh, plus a ring of coupling holes ch' and an adjacent ring of partition holes h, concentrically surrounding center hole sh. These holes h, ch' will, as in FIG. 13, be provided with respective rims, or semi-rims, as required by the desired jet stream selection for a particular disk face. But disk dd' adds a second concentric ring of air holes h$_1$ (four here, inside the "h-hole ring", these adapted to project dummy-separation air out in four respective quadrants to separate the dummy disks, only). This illustrates that where more air holes are desired, one or more additional rings of holes may be incorporated (as space on the floppy disk allows). Similarly, another supplemental ring of partition holes may be added, outside the "h-hole ring" and along outer track T$_k$, indicated in phantom and schematically. These supplemental partition holes will, of course, have a like pattern of rims and semi-rims as dictated by the desired jet selection for this disk face. And, this may be implemented as indicated for disk dd in FIG. 13.

"NON-RIMMED" VERSIONS; FIGS. 10, 11 AND 12

Figure 10:
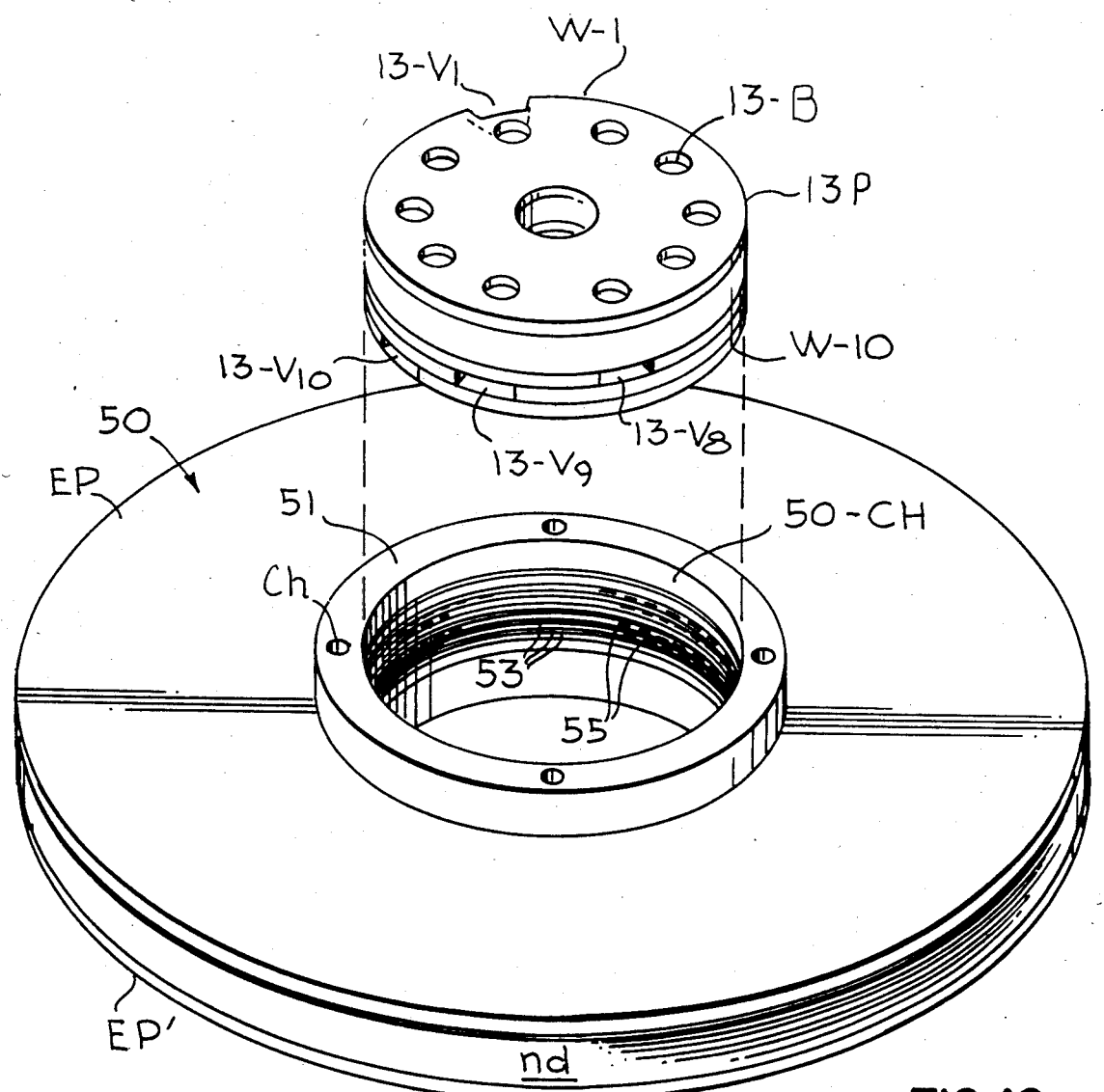
FIG. 10 is a schematic perspective of a pack modified from that shown in FIG. 1 and with a different non-preferred arrangement for supplying gap-air to the records thereof.

FIGS. 10 through 12 illustrate "non-rimmed" versions of means for conducting partition air—here presented only to offer a contrast with the "rimmed" versions of this invention. FIG. 10 shows one that involves a "hub-distributor" 13-P for partition air; something that leaves the disks and intervening spacers unmarked by partition holes, but made-up of platels W-1 through W-10 which include the ring of partition holes, (like holes h above), with one hole on each plate "cut-out" radially to divert separation air to its gap. More details on FIGS. 10–12 may be seen in companion commonly assigned U.S. Ser. No. 292,072 entitled "Spacers for End-Wise Pneumatic Partitioned Disk Pack" by inventors Herbert U. Ragle and Dean DeMoss filed on Aug. 12, 1981 and incorporated herewith by this reference.

FIG. 11 illustrates inter-disk spacers which are "radially cut-out", rather than "rimmed". Here, it will be assumed that eleven (11) spacer disks are provided (only 3 shown) for a 10-disk pack Pk. All ten partition apertures H-1 through H-10 are provided in the bottommost spacer SD-1, while each successive spacer thereabove eliminates one more such aperture. Thus, as FIG. 11 suggests, spacer SD-2 eliminates aperature H-1; SD-3 eliminates H-1 plus H-2 . . . , SD-8 eliminates H-1 through H-7. Uppermost spacer SD-11 (not shown) has no apertures H at all.

An extra hole (sight-hole h$_o$) is preferably supplied in all the spacers SD to assure pack registration.

Thus, this pack contemplates a blank spacer SD-11 plus ten (10) apertured "inter-disk" spacers, SD-1 through SD-10—each latter having a different respective radial communication ("cut-out" or slotting SL) to communicate with the corresponding inter-disk gap—e.g., slotting SL-1 communicates with the gap $g_{1-2}$ between disks FD-1 and FD-2, pneumatically coupling $g_{1-2}$ to the bore formed by apertures H-1.

Of course, alternatively, each spacer SD may be supplemented by a second inter-disk spacer—being fully-apertured as in prior art embodiments.

FIG. 12 illustrates a modified spacer 11-S, generally like spacers SD in FIG. 11, except that involves a "single-stamping" or common spacer pattern to be used throughout the disk pack. That is, each floppy disk in the pack will be understood as identical, being formed with 20 apertures, each to be registered with one of the spacer-apertures 11-A and having one of the identical spacers 11-S of each side thereof. Each of the identical spacers 11-S also has a set of clamp-post holes 11-h (four shown), each of these being adapted to receive a clamping post for retaining the pack together. Each spacer 11-S also has a pair of radial vents, or cut-outs, (see 11-ct at apertures #1 and #11 in FIG. 12). The spacers are differentially stacked so that cut-outs 11-ct fall at different successive aperture site pairs up disk stack (e.g., with 20 identically numbered holes hh in the stacked disks, registering with apertures #1 through #20, one might position the "first" spacer $11-S_1$ in the "first" inter-disk gap so that cut-outs 11-ct register with the disks' partition holes #1 and #11; then position the "second" spacer $11-S_2$ to be "rotated-by-one" so that its cut-outs register with disk holes #2 and #12, and so on, rotating each spacer "by-one" as one proceeds up the disk stack).

In this fashion, spacers 11-S will be stacked between respective disks so that their cut-outs service (direct air to) a different respective inter-disk gap.

PARTITION PLUG; FIG. 10

FIG. 10 indicates a "radially vented" plug for distributing separation air. Here, plates W are assembled into a prescribed cylindrical partition plug 13-P as part of a "partitioning piston" array (not shown) adapted to selectively partition a floppy pack 50 of relatively known conventional construction.

FIG. 10 indicates a flexible disk pack 50 in exploded relation with the associated partitioning piston or plug 13-P. Pack 50 is comprised of a coaxial stack of identical, commonly-supported, flexible disk records 55, understood as mounted and retained, along with intermediate conventional spacers 53, between a pair of opposed flexible end-plates, EP, EP'. Disks 55 are spaced-apart a prescribed uniform distance by identical conventional annular separator rings 53 which are radially-vented, or made radially "air permeable". The array of disks and inter-disk spacers is clamped firmly between the end-plates by a pair of opposed collars 51, 51' (only 51 shown) using means known in the art (e.g., with bolts or rivets threaded through holes ch in collars 51, disks 55 and spacers 53; or by like fastener means understood by workers in the art).

The inner circumferences of disks 55, of spacers 53 and of collars 51, as so stacked and clamped together, as to be relatively congruent and define the sides of a cylindrical center-hole 50-CH of prescribed diameter and height as known in the art. Plug 13-P will be understood as disposed in hole 50-CH so that its ten respective plates W lie with their radial-vented holes 13-v aligned to communicate with associated inter-disk gaps (e.g., hole $13-v_1$ with the uppermost gap $g_1$, under top plate W-1 $13-v_{10}$ with the lowermost gap $g_{10}$, etc.).

Workers will recognize that special pains must be taken to assure this alignment—something very difficult for a removable pack.

Flexible disks 55 and spacers 53 are of a type known in the art and, as workers will appreciate, may assume various dimensions and compatible constructions.

More particularly, vented ring spacers 53 help to maintain recording disks 55 normally separated and lubricated by a thin film of air, as well as serving, during special partition times, to pass partitioning air jets. Workers will recognize that such pneumatic separation depends upon the clearance dimension CL between the outer side walls of plug 13-P and the inner walls of pack center-hole 50-CH. If this clearance is not above a certain minimum, a vacuum will result between disks 55, pulling them together; while if it is too large, excessive air-flow between disks may agitate them.

Workers in the art will recognize that flexible disk packs like pack 50 are apt for use with such "interior pneumatic partitioning" means, like partitioning plug 13-P.

Partitioning cylinder 13-P is adapted to direct a "disk-parting" air jet radially-outward through a disk pack like that described (including vented spacers) and will be understood as comprising a stack of plates W, each identically apertured (see ten holes 13-B in each) with (one or more of) these holes having a radial vent 13-v (e.g., in the manner of spacers 11-S of FIG. 12). Here, one of the ten partition holes 13-B is radially cut-out (e.g., at $13-v_1$ on top plate W-1; at $13-v_{10}$ on bottom plate W-10, etc.)—these cut-outs being deployed at different successive sectorial positions about plug 13-P as shown.

Thus, when plug 13-P is properly positioned in center-hole 50-CH of pack 50, and with the pack and plug properly spun-up in synchronism, partition air will be drawn up a selected bore through plug 13-P and will issue radially out through the associated vent 13-v, and projected into the associated inter-disk gap g, traversing the associated intermediate vented spacer 53.

The foregoing description of the "non-rimmed" partition in FIGS. 10 through 12 will be understood as indicating techniques and structures serving to highlight the differences and advantages of the preferred "rimmed" embodiments described herein.

Figure 15:
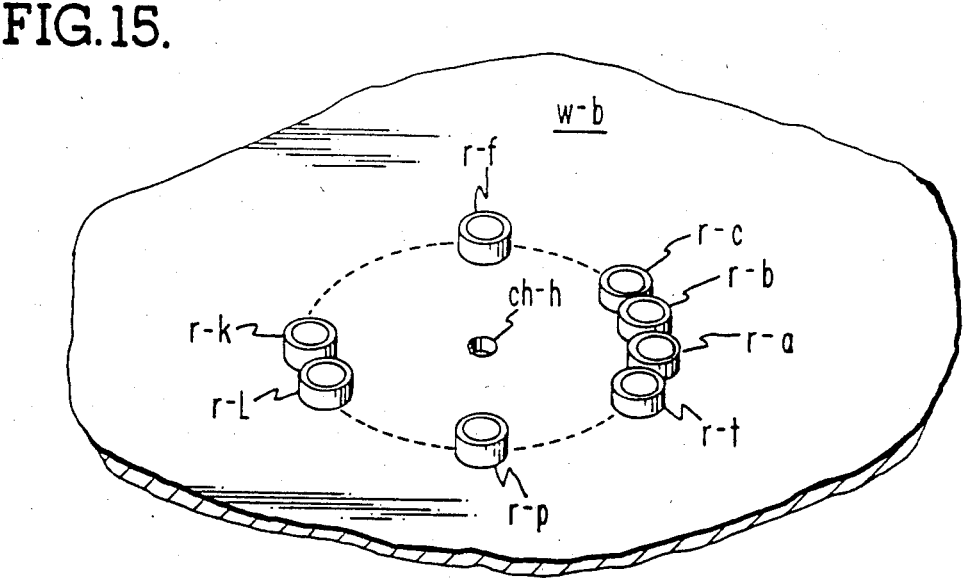

—Segmented spacers on web; from common blank:

FIG. 15, illustrates an array of rims r-a, r-b, etc. like that of FIG. 4 except that these are mounted in removable fashion upon a common mounting web w-b (e.g., of plastic), with a centering hole ch-h. Such rim means will be understood as intended for attachment to a floppy disk (e.g., as in FIG. 13)—e.g. being removably affixed on blank w-b so that, once the web has been co-centered with a subject floppy (e.g., via a common centering hole ch-h), and rims r-a, r-b, etc. pressed against this floppy, these rims can be made to adhere thereto relatively permanently, whereupon web w-b is removed and discarded. For instance, as workers known, the exposed face of each rim may be coated with a quick drying adhesive for this attachment to the floppy, having a tear-away adhesive on its opposite face for ready separation from web w-b.

Figure 16:
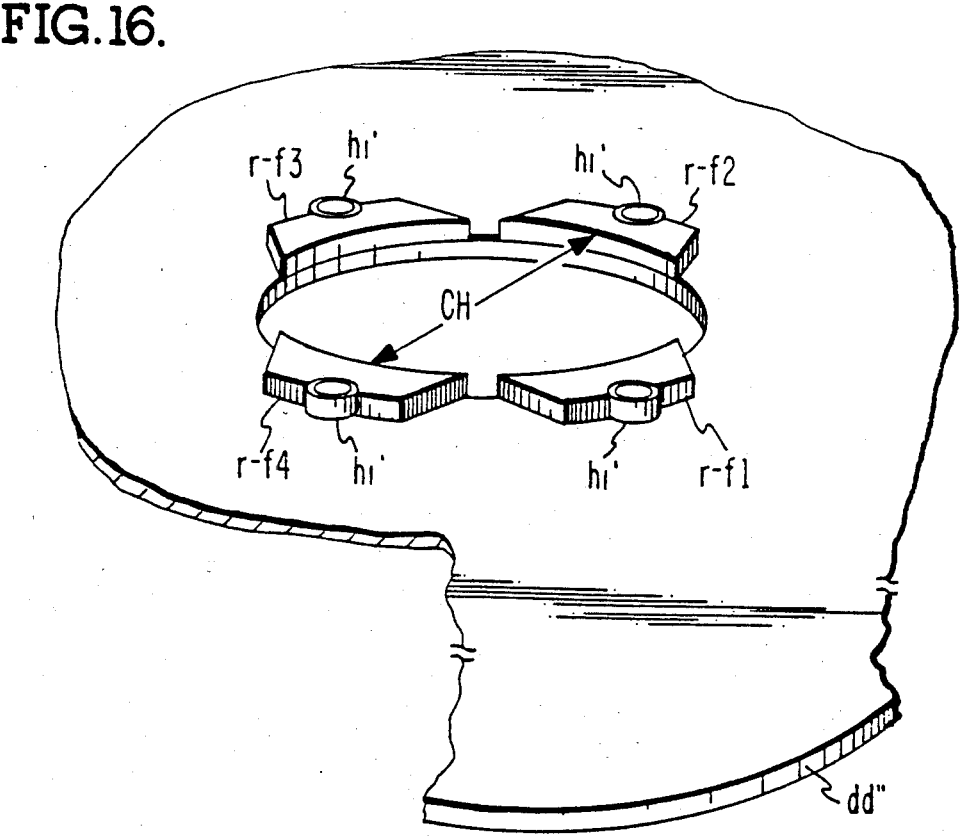

FIG. 16 indicates a functionally-similar array of rim-spacer segments $r-f_1$, $r-f_2$, etc.; attached on floppy dd; each diverting air through an associated disk hole $h_1$, while surrounding disk center-hole CH. These segments are preferably web-mounted and applied to disk dd" as were segments r-a, etc. in FIG. 15.

And, FIG. 17 illustrates a like array of (4) rim-segments or "wings" r-f for such holes $h_1$; however, these four being indicated as formed from a common segment-blank S-B. That is, rather than requiring a mounting web, these segments may be partly formed on blank S-B (i.e., arcuate cut-outs for partly rimming the four disk holes $h_1$; plus four intermediate V-indentations s-v), then the blank attached to disk dd" (being co-centered therewith via its centering-hole sh'); and, lastly, the blank is cut-out centrally (cf at phantom line c-o). Depending on how the four "wings" r-f are formed (indentation s-v), this cut-out c-o can leave them separated on disk dd" to a greater or less degree.

Workers will recognize how this "common-blank" attachment to a disk with subsequent central relief of the blank" (to form such segments in an annular array) will be highly advantageous—e.g., being adopted or part of the floppy disk fabrication sequence.

The foregoing is further detailed in FIGS. 18, 19 where, a somewhat modified annular array of spacer segments r-ff will be understood as formed from a single blank S-bb having a centering hole ch-h. Blank wbb may be of a suitable plastic adapted to be bonded (e.g., with adhesive, and/or welding heat) to a respective floppy disk in the foregoing manner (—the "wings" rr-ff being indicated in FIG. 18 in phantom prior to being stamped-out from blank S-bb'. The so-stamped blank S-bb is shown in FIG. 19 as bonded on disk dd", with the "wings" r-ff disposed between disk-hole $h_1'$ and co-centric therewith). Then, once attached on floppy disk dd", the blank S-bb will be understood as cut-out (along c-o, in phantom cut, concentric with ch-h and holes $h_1'$) to render the four separate independent rim/spacer segments now "integral" with the floppy.

Of course, other differently configured rims, spacer-segments, etc. may be likewise formed on a floppy disk.

CONCLUSION

It will be appreciated that novel arrangements and techniques for fabricating "self-spaced" flexible disks as here described, may be used, for the indicated and or other related applications and be advantageously employed in various ways. Such arrangements will be seen as especially advantageous in conjunction with disk packs like those described. It will also be understood that the preferred embodiments described herein are only exemplary and that they are susceptible of many modifications and variations in construction, arrangement and use, without departing from the spirit of the invention.

Further modifications of the invention will be contemplated. For example, the means and methods disclosed herein are also applicable with other different spacer means and/or other rim means. Also the present invention is applicable for use with various other means for partitioning a floppy pack.

The above examples of possible variations of the present invention are merely illustrative. Accordingly the present invention is to be considered as including all possible modifications and variations coming within the scope of the invention as defined by the appended claims.

What is claimed is:

1. A novel "self-spacing" floppy disk with at least one array of separate spacer segments disposed concentric with the disk center, each array being disposed on a respective disk face and being formed from a single segment-blank attached on the disk and centrally stamped in the forming of a center-hole.

2. The combination as recited in claim 1 where segments are of like configuration and extend out from the center-hole.

3. The combination as recited in claim 2 where segments are formed from a plastic blank.

4. The combination as recited in claim 1 comprising a number of such disks and attached segments as stacked in a floppy pack with the segments adapted to facilitate pneumatic separation by streams of pressurized air.

5. The combination as recited in claim 4 wherein the segments define inter-disk spacer means of constant height.

6. The combination as recited in claim 5 wherein other apertures are formed through the disk and wherein the segments also define rim means at least partly surrounding these apertures.

7. A method of forming a "self-spacing" floppy disk comprising:
   forming a "floppy-blank" of flexible recording material;
   forming a "segment blank" to include peripheral indentations adapted to facilitate a central cut-out bore leaving a plurality of separate spacer land portions disposed about this bore;
   attaching the "segment blank" to one side of the "floppy-blank"; and so cutting-out the bore in the segment blank to form a ring of said land portions separate from one another and adapted to function as spacer means when the disk is stacked in a floppy pack with other like floppy disks.

8. The method of claim 7 wherein the cutting-out also serves to define a center-hole in the disk.

9. The method of claim 8 wherein at least some of the segments so formed function as rim means, each surrounding at least part of an associated hole through the disk.

10. The method of claim 9 wherein a "floppy pack" is formed by so-fabricating like "self-spacing" floppy disks and then stacking them in registry for co-rotation and as adapted for pneumatic separation of the disks, so stacked.

11. An improved "floppy disk pack" comprising a stack of like "self-spacing", "self-venting" floppy disks, each disk formed to include an annular array of separate independent spacer segments attached on one side thereof, being formed from a common spacer-blank.

12. The combination as recited in claim 11 wherein the segments serve to separate the disks from one another a prescribed uniform distance, being formed from a single ring-blank attached to each respective disk.

13. An improved "self-spacing" flexible recording disk characterized by an annular array of separate, independent separator segments attached thereto and adapted to accommodate a prescribed separating airflow between such disks when stacked into a disk pack, the segments being formed from a common blank.

14. A method of forming a "self-spacing" floppy disk comprising: forming a floppy disk blank; attaching thereto a spacer-blank having prescribed separate, independent "segment portions" about the periphery thereof, and cutting a center-bore into the so-formed composite-blank, this cutting also serving to remove all spacer-blank portions except for said "segment portions".

15. In an improved pack of flexible disks adapted to be pneumatically partitioned axially and wherein the disks are each formed with gas-conducting holes therethrough, the combination therewith of:

an annular array of separate, independent rim segments disposed in each gap between respective disks and adapted to direct the gas stream passing through a respective disk hole and also to provide a reference platform against which the disks may be pressed; these segments being formed on each disk from a common segment-blank attached thereto and centrally relieved.

16. The combination as recited in claim 15 wherein at least some of the segments comprise like flat-faced annular rings or "annulets" of identical height surrounding a respective one of said holes.

17. The combination as recited in claim 16 wherein the pack includes fastener means connecting associated collar means so as to press the disks and spacer segment means together, each disk also including an array of fastener-holes adapted to pass said fastener means; and wherein the segments further includes "fasten-annulets" surrounding each such fastener-hole.

18. In an improved pack of flexible disks adapted to be pneumatically partitioned axially and wherein the disks are formed and stacked with gas-conducting holes therethrough, the combination therewith of:

an annular array of separate, independent spacer segments attached on at least one side of each disk to define a constant gap between respective stacked disks and also to provide a reference platform against which the disks may be pressed;

at least some of the segments comprising one or more like flat-faced arcuate segments of identical height disposed between respective ones of said holes, the array of spacer segments being formed from a common blank.

19. The combination as recited in claim 18 wherein the segments in each gap include one or more "diverting segments" adapted and disposed to divert the gas stream.

20. The improved pack of flexible disks of claim 18 as adapted to be pneumatically partitioned axially; the disks being formed with gas-conducting holes therethrough, with at least some of the segments at least partly surrounding partition-holes through each disk to divert partition air between stacked disks in the pack.

21. The combination as recited in claim 20 wherein said pack is removable, including a central hub-opening and, being fastened between upper and lower collar means and wherein said segments form a "hub-rim" surrounding this hub-opening; and wherein certain of the segments are disposed and adapted to divert partition air.

* * * * *